April 16, 1963 L. V. GUEST 3,085,759

MAGNETIC TAPE RECORDER AND REPRODUCER

Filed Dec. 19, 1960 6 Sheets-Sheet 1

INVENTOR

Lawrence V. Guest

BY

Kemon, Palmer & Stewart

ATTORNEY

MAGNETIC TAPE RECORDER AND REPRODUCER

Filed Dec. 19, 1960

INVENTOR
Lawrence V. Guest
BY
Kemon, Palmer & Stewart
ATTORNEY

April 16, 1963 L. V. GUEST 3,085,759

MAGNETIC TAPE RECORDER AND REPRODUCER

Filed Dec. 19, 1960 6 Sheets-Sheet 3

INVENTOR

Laurence V. Guest

BY

Kemon, Palmer & Stewart

ATTORNEY

INVENTOR
Lawrence V. Guest
BY
Kemon, Palmer & Stewart
ATTORNEY

INVENTOR
Lawrence V. Guest
BY
Kemon, Palmer & Stewart
ATTORNEY

INVENTOR
Lawrence V. Guest
BY
Kemon, Palmer & Stewart
ATTORNEY

United States Patent Office 3,085,759
Patented Apr. 16, 1963

3,085,759

MAGNETIC TAPE RECORDER AND REPRODUCER

Lawrence V. Guest, Old Hill, England, assignor to Birmingham Sound Reproducers Limited, Old Hill, England, a British company Filed Dec. 19, 1960, Ser. No. 76,626
2 Claims. (Cl. 242—55.12)

The present invention relates to sound recording and reproducing apparatus of the kind making use of magnetic record tapes, hereinafter referred to as tape recorders.

With known tape recorders the tape moves between two spools mounted upon carriers rotatable about parallel axes and during recording or reproduction the tape is held in pressure contact with a constant speed spindle commonly termed the capstan spindle by means of a pressure roller and the tape is drawn from the take-off spool by the pull of the capstan spindle and is wound on to the take-on spool which is driven by the motor of the machine, some form of slip coupling being provided between the take-on spool and a driving element therefor.

When a record has been made it is necessary to be able to rewind the tape from the take-on spool on to the take-off spool before reproduction of the made record can be carried out.

In some circumstances it is also necessary to be able to wind tape on to the take-on spool without recording in order for example to be able to select a part of a made record for reproduction or an unrecorded part of the tape in readiness for making a record thereon.

It is usual therefore to provide selective driving means whereby such re-wind or wind-on can be effected at high speed, either one of the carriers of the spools on to which tape is required to be wound being in such circumstances driven by the machine motor and the other being driven by the pull of the tape, and the pressure roller being meantime held disengaged from the tape and capstan spindle.

Whenever operation of the machine ceases the spools are brought to a standstill rapidly by the application of brakes to the carriers and the pressure roller if not already disengaged, is moved to disengage it from the tape and capstan spindle, and it is desirable and even essential that the carriers and spools be halted with the free loop of tape between the spools maintained under tension.

It is an object of the present invention to provide an improved arrangement for effecting braking of the spool carriers and therefore of the tape spools carried thereby.

The invention consists in a tape recorder of the kind having two carriers for tape spools on parallel axes and each rotatable in both directions, said tape recorder being provided with spool braking means comprising two pivoted levers each having a friction pad on one arm for braking engagement with a respective one spool carrier, spring means biasing the levers towards the "brake-on" position, a hand-controlled member and a movable element movable by said hand-controlled member between four alternative positions including a first position in which it is disengaged from said two levers to permit said levers to occupy brake "on" positions and three further positions in which it is engaged with both said levers and retains them in brake "off" positions.

Entry of the movable element into one of said three further positions may take place with substantially simultaneous engagement with both of said levers to release the brakes from both spool carriers simultaneously, whilst entry of the movable element into either one of the other two of said three further positions effects engagement with the two levers and release of the brakes from the two spool carriers in sequence, the sequence of engagement and brake release in one of said two positions being the reverse of that in the other of said two positions. The arrangement is such that in either direction of required movement of the tape, the brake is released from the spool carrier supporting the spool on which tape is to be wound, earlier than the brake is released from the spool carrier supporting the spool from which tape is to be wound off.

Similarly, retraction of the movable element from either one of said two positions permits re-application of the brakes to the two spool carriers in sequence, and irrespective of the direction in which the tape is being moved the brake is applied to the spool carrier supporting the spool from which tape is being wound off earlier than it is applied to the spool carrier supporting the spool onto which tape is being wound.

In a preferred arrangement the movable element operating the brakes may also be used to effect the movements of the pressure roller towards or away from the position of pressure engagement of the tape with the capstan spindle.

The invention is illustrated by way of example in the accompanying drawings and in which FIG. 1 is a plan view of a machine with the parts in a rest or stationary condition.

FIG. 3 is a plan view showing the parts in the positions occupied during rapid wind-on.

Figure 1:
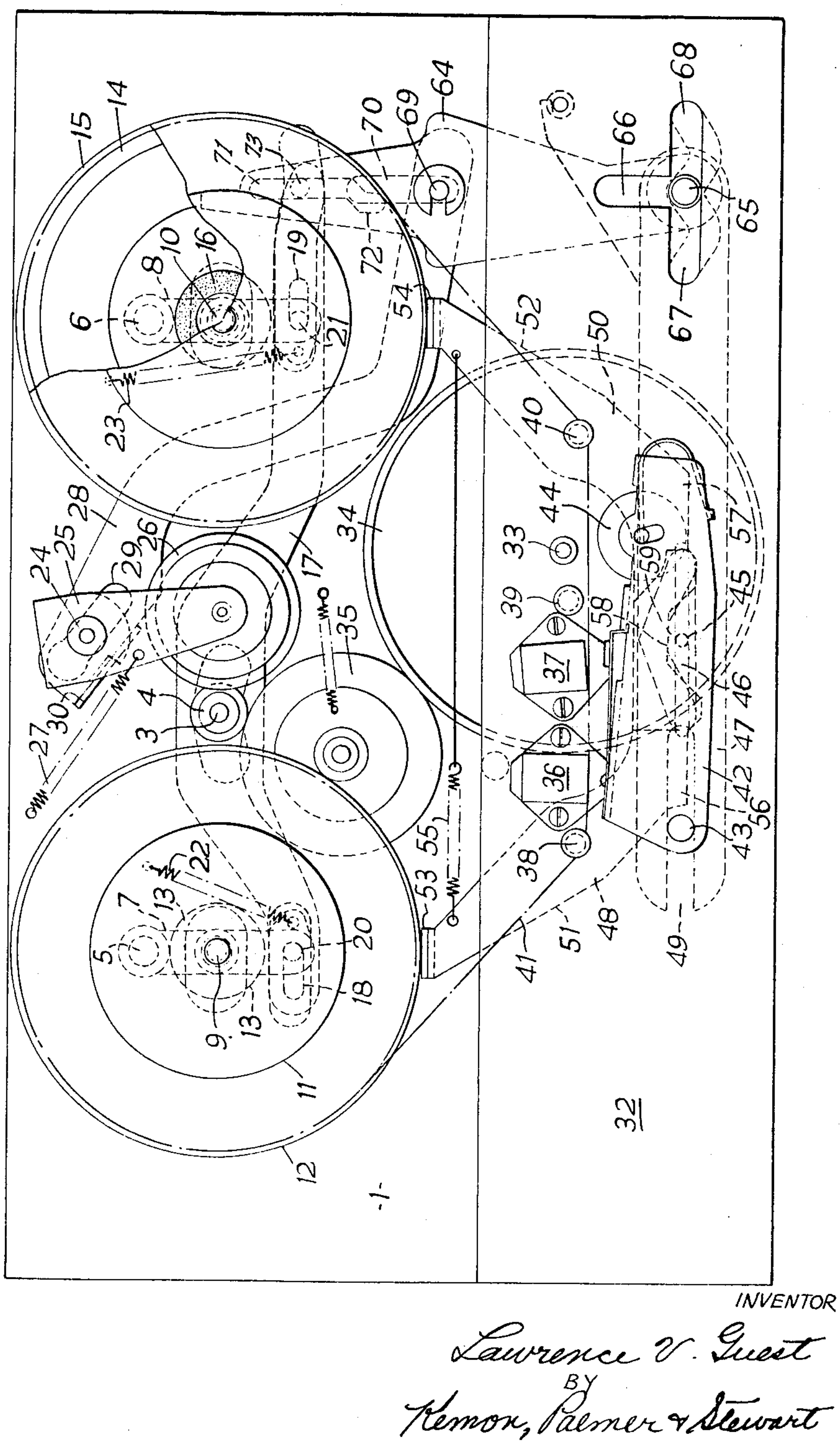

Referring to the drawings the machine shown comprises a base plate 1 having a constant-speed electric motor 2 suspended from its underside, the spindle 3 of the motor extending vertically upwards and carrying above the base plate 1 a friction pulley 4.

On fixed vertical pivots 5 and 6 on the base plate 1 and on substantially diametrically opposite sides of the motor spindle 3 are mounted two similar levers 7 and 8 and in bearings at points approximately mid-way of the length of these levers are rotatably mounted two vertical spindles 9 and 10. On the spindle 9 which will be termed the take-off spindle, is affixed a disc 11 and upon this disc and also engaged over the upper end of the spindle 9 rests a take-off spool carrier 12 with the interposition of a friction member 13 of felt or the like.

On the spindle 10 which will be termed the take-on spindle is affixed a disc 14 and upon this disc 14 and also engaged over the upper end of the spindle 10 rests a take-on spool carrier 15 with the interposition of a friction washer 16 (FIG. 1) of felt or the like. The disc 14 is of similar diameter to the take-on spool carrier 15 and constitutes the drive disc for the carrier.

A bar 17 extends transversely across the base plate 1 and is provided near each end with elongated slots 18, 19, receiving pins 20, 21 on the free ends of the levers 7 and 8 and tension springs 22 and 23 connected between the base plate and the levers bias the levers 7 and 8 about their pivots 5 and 6 in the direction towards one another and therefore the pins 20 and 21 towards the ends of the two slots 18 and 19 which are nearest to one another.

On a fixed vertical spindle 24 upstanding from the base plate 1 is mounted a yoke-piece 25 so as to be capable of up and down as well as transverse swinging movement thereon and at the underside of the end of the upper limb of the yoke-piece 25 is mounted a friction wheel 26 for rotation about a vertical axis in a plane substantially common to that containing the axes of the motor spindle 3 and the spool carrier spindles 9 and 10.

In the raised position of the yoke-piece 25 and the friction wheel 26, the wheel 26 lies in the plane of rotation of the take-on spool carrier 15 and in the lowered position the friction wheel 26 lies in the plane of rotation of the drive disc 14.

A spring 27 is connected between the yoke-piece 25 and the base plate 1 biasing the yoke-piece and the friction wheel 26 downwards and towards the pulley 4 on the motor spindle 3.

Figure 5:
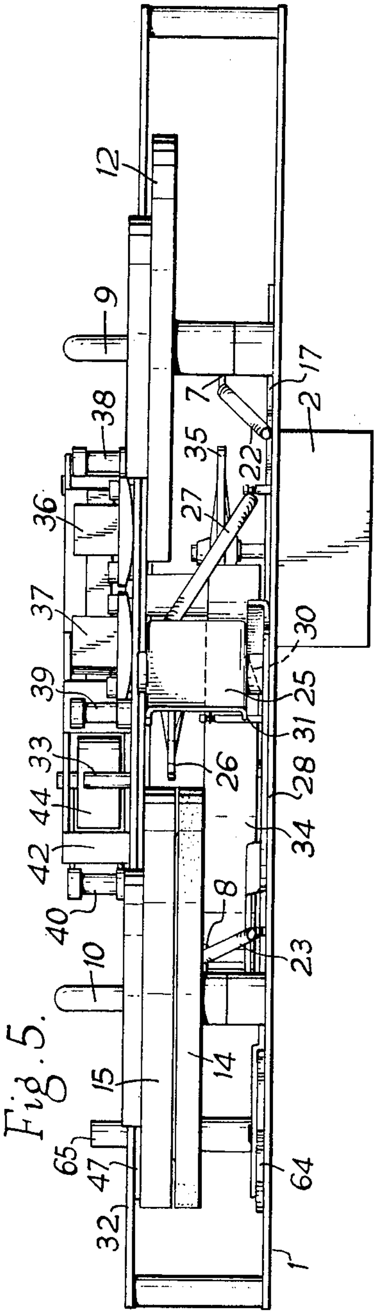
FIG. 5 is a view in rear elevation with the parts in the position corresponding to those of FIG. 4.
Figure 6:
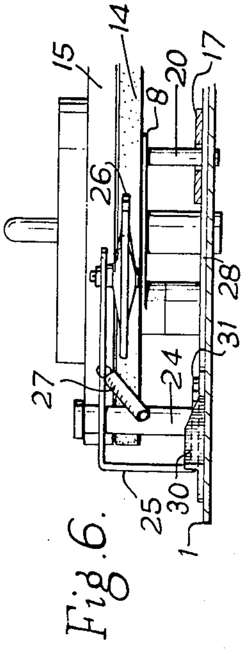
FIG. 6 is a view of the arrangement as seen in the direction of arrows VI—VI in FIG. 2 showing some of the parts in the positions corresponding to those of FIG. 2.

A link 28 is mounted for sliding movement on the base plate 1 said link being provided with a slot 29 engaged over the spindle 24 whereby one end of the link 28 is guided, and on the end of the link adjacent the spindle 24 is provided an inclined ramp 30 for engagement below the lower limb 31 (FIGS. 5 and 6) of the yoke-piece to raise or lower the friction wheel 26 according as the link 28 is moved in one direction or the other in the general direction longitudinally of itself in a manner yet to be described.

A fixed bridge plate 32 extends across the front of the base plate 1 in parallel and spaced relation thereto and in suitable fixed bearings is mounted a vertical capstan spindle 33 extending from below to above the bridge piece 32 and on the spindle 33 below the bridge piece is affixed a flywheel 34. A further friction wheel 35 is mounted above the base plate 1 for engagement between the pulley 4 on the motor spindle 3 and the periphery of the flywheel 34 to drive the capstan spindle 33 at constant speed.

Transducer heads 36 and 37 of conventional form are mounted on the bridge piece 32 as well as fixed guide posts 38, 39 and 40 for guiding the loop 41 of record tape extending between tape spools (not shown) carried upon the spool carriers 12 and 15, past the transducer heads 36 and 37 and the capstan spindle 33.

On the bridge piece 32 is mounted a frame 42 pivoted at 43 and providing a support for a yieldingly mounted pressure roller 44 of rubber or the like.

In the underside of the frame 42 is formed an elongated slot 46 into which extends a pin 45 fixed upon and upstanding from a bar 47 mounted for longitudinal sliding and limited horizontal rocking movements with reference to the fixed pivot pin 43 of the frame 42, the pin 43 engaging in a further longitudinal slot 49 formed in the bar 47. Rocking movements of the bar 47 take effect through the pin 45 and slot 46 to move the frame 42 about its pivot 43 either in the direction to engage the roller 44 with pressure against the tape 41 to hold it in driven engagement with the capstan spindle 33 or in the reverse direction to free the tape from such driven engagement with the capstan spindle 33.

To the underside of the bridge piece 32 are pivotally mounted two substantially similar two-armed flat brake levers 48 and 50 the pivots thereof, which for convenience are formed by the lower ends of the guide posts 38 and 40 for the tape, being spaced from one another by a distance less than that between the axes 9 and 10 of the two spool carriers 12 and 15 and located on a line substantially parallel to a line joining those axes and in positions approximately symmetrical with reference to the centre of the space between the spool carriers.

The outer arms 51 and 52 of the brake levers 48 and 50 extend at an inclination towards the peripheries of the spool carriers 12 and 15 and are provided on their extremities with brake shoes 53 and 54 and the arms 51 and 52 are connected with one another by a tension spring 55.

The inner arms 56 and 57 of the brake levers 48 and 50 extend towards and overlap one another and they are provided on their edges remote from the spool holders with recesses of similar shape which envelop the above described pin 45 upstanding from the bar 47 and projecting through the slot 46 in the frame 42 carrying the pressure roller 44.

The recesses include longitudinally extending bottom edges 58 and 59 which in the brakes "on" position shown in FIG. 1 are substantially coincident.

Figure 7:
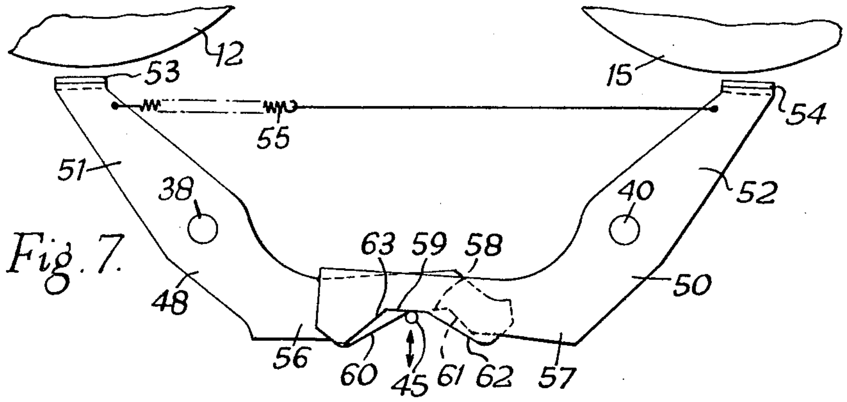
FIGS. 7, 8 and 9 are diagrammatic views showing the mode of operation of the brake levers.
Figure 8:
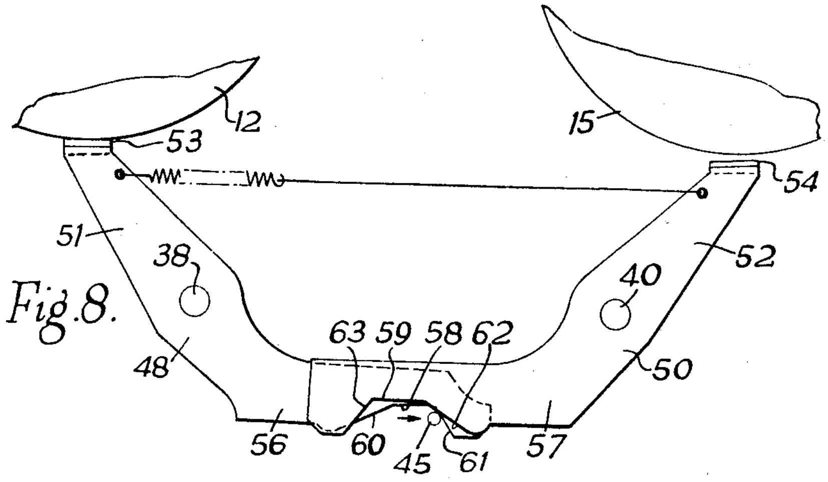
Figure 9:
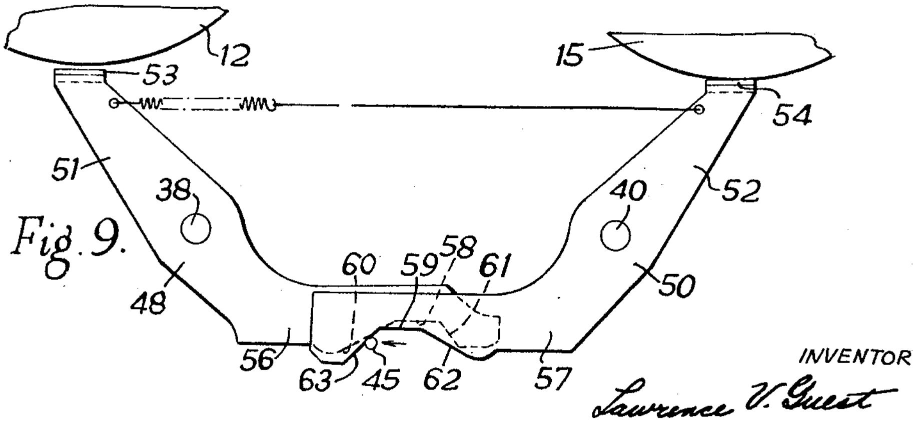

The end edges of the recesses are inclined to the respective bottom edges 58, 59 and the inclination of one end edge of each slot is greater than the inclination of the other end edge of that slot as best seen at 61 and 63 and 60 and 62 in FIGS. 7, 8 and 9 the end edge 61 or 63 of greater inclination in each recess being arranged adjacent the end edge 60 or 62 of lesser inclination in the other recess and the pair of end edges 60 and 63 and 61 and 62 at the respective end of the composite recess intersect one another in the rest position of the apparatus as shown in FIG. 1.

Hand operated means are provided for effecting the movements of the bar 17, link 28 and bar 47. Such means consists of a flat lever 64 extending from beneath the bridge piece 32 and over the base plate 1 and capable of both longitudinal and rocking movement.

One end of the lever 64 is provided with an upstanding post 65 accessible to the hand of the user and arranged for guided movements in any one of the three limbs 66, 67 and 68 of a T-shaped slot in the bridge piece 32. The above described bar 47 is pivotally connected with the lever 64 on an axis co-axial with the post 65.

The lever 64 is pivotally connected at a point approximately mid-way of its length with the free end of the link 28 through a pin 69 also arranged for guided movement in an elongated slot 70 formed in the base plate 1 and extending in the general longitudinal direction of the lever 64.

The free end of the lever 64 is provided with an elongated slot 71 the major part of which extends longitudinally of the lever 64 whilst the end of said slot 71 nearest the pin 69 on the lever 64 is offset to one side of and parallel with said major part as shown at 72. The slot 71, 72 is engaged over a pin 73 fixed on the end of the bar 17.

The operation of the machine is as follows:

With the hand operated post 65 on the lever 64 located at the junction of the three limbs 66, 67 and 68 of the T-shaped slot as shown in FIG. 1, the machine is at rest. In this rest position the frame 42 is held by the engagement of the pin 45 on the bar 47 in the slot 46 in the frame 42 connected with the post 65 in the position shown in FIG. 1 in which the pressure roller 44 is away from the tape 41 and the capstan spindle 33. Furthermore, the pin 45 upstanding from the bar 47 connected with the post 65 is located at approximately midway of the length of the superposed recesses in the arms 56 and 57 of the brake levers 48 and 50 and engagement of the pin 45 in the slot 46 in this position of the bar 47 and the frame 42 maintains the pin 45 spaced from the bottom walls 58 and 59 of the recesses so that the brake levers 48 and 50 occupy the brakes "on" position in contact with the spool carriers under the pull of the spring 55.

The pin 69 connecting the lever 64 with link 28 is in one end of the slot 70 in the base plate 1, i.e. the lower end in the drawings, in which the link 28 is held with the ramp 30 engaged beneath the lower limb 31 of the yoke piece 25 so that the yoke-piece and the friction wheel 26 are held in their raised position in which the friction wheel 26 is in the plane of rotation of the take-on spool carrier 15 resting on the drive disc 14.

The pin 73 on the bar 17 is engaged in the major longitudinally extending part of the slot 71 in the lever 64 so that the bar 17 is held in an intermediate position as shown in FIG. 1 in which the adjacent or inner ends of the slots 18 and 19 in the bar form abutments for the pins 20 and 21 on the spring-loaded spool carrier-bearing levers 7 and 8, so that the take-off spool carrier 12 is held away from driving engagement with the pulley 4 on motor spindle 3 and the take-on spool carrier 15 and the rotatable drive disc 14 are held in a position in which there is no driving engagement between the take-on spool carrier 15, friction wheel 26 and the pulley 4 on the motor spindle 3.

Figure 2:
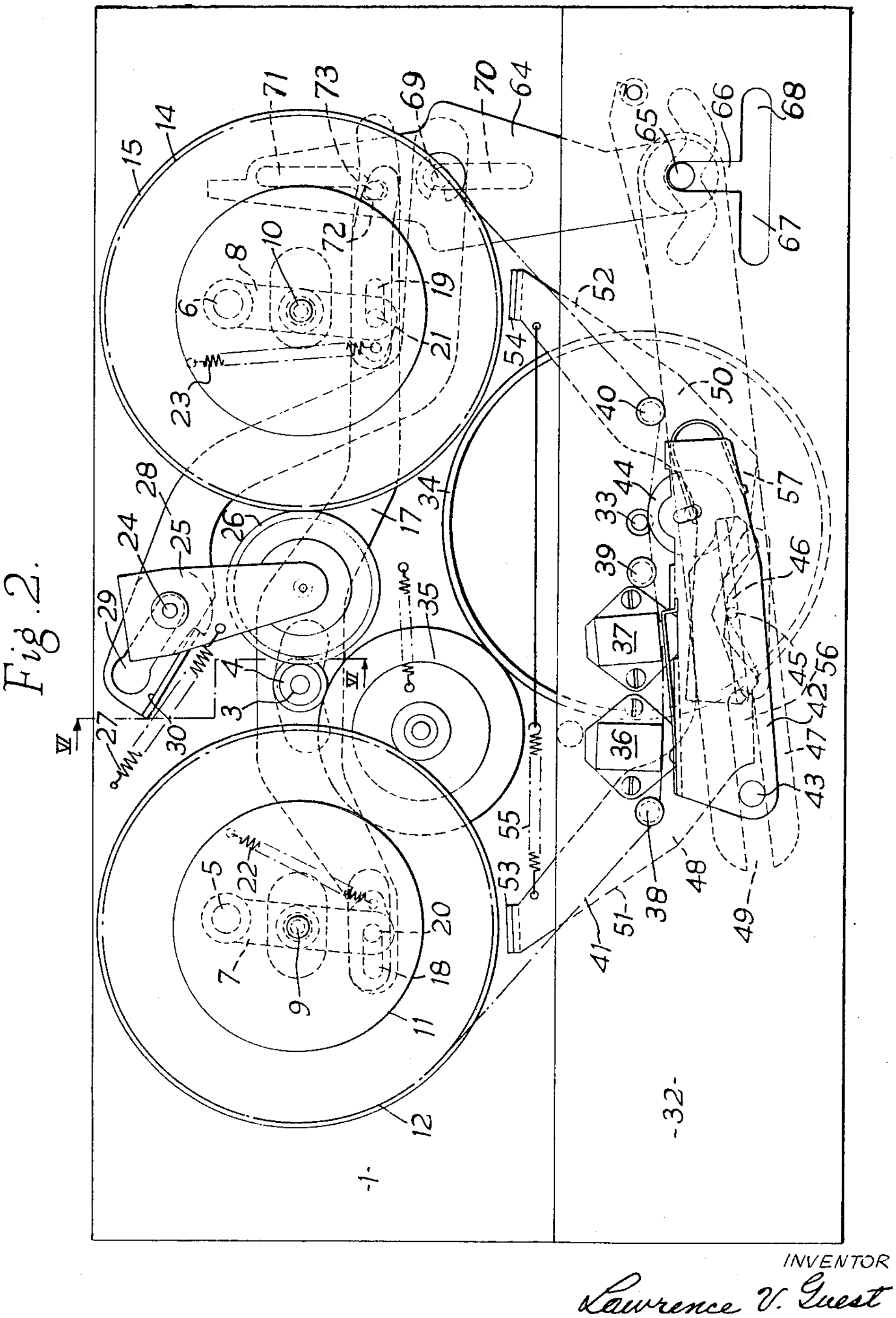
FIG. 2 is a plan view showing the parts in the positions occupied during recording or reproduction.

To initiate recording or reproduction the post 65 is moved into the stem of the T-shaped slot represented by the limb 66 from the position shown in FIG. 1 to that shown in FIG. 2.

This movement involves a linear movement, upwards in the drawings, of the lever 64.

The pin 69 on the lever 64 moves to the upper end of the slot 70 in the base plate 1 and a thrust is imparted to the link 28 such as to move the ramp 30 from below the lower limb of the yoke-piece 25 so that the friction wheel moves downwards into the plane of rotation of the rotatable drive disc 14.

As the lever 64 moves into its uppermost position as shown in FIG. 2, the offset portion 72 of the slot 71 in the lever 64 engages the pin 73 on the bar 17 so that the bar 17 is moved endwise i.e. to the left from the position of FIG. 1 to that of FIG. 2 in which the take-off spool carrier is further away from contact with the pulley 4 on motor spindle 3, against the pull of spring 22 acting upon the spool-bearing pivoted lever 7 whilst the assembly comprising the take-on spool carrier 15 and rotatable drive disc 14 is moved in the direction towards the motor spindle 3, the periphery of the rotatable drive disc 14 making contact with the friction wheel 26 and the friction wheel 26 making contact with the pulley 4 on motor spindle 3 so that the rotatable drive disc 14 is set in rotation.

Movement of the lever 64 upwards also effects a rocking movement of bar 47 about the pin 43 and the frame 42 is thereby rocked through the engagement of the pin 45 on the bar in the slot 46 in the frame to cause the pressure roller 44 to press the tape loop 41 against the capstan spindle 33 now being rotated from the motor spindle through the further friction wheel 35 and the flywheel 34 on the capstan spindle 33.

During the same rocking movement of the bar 47 and frame 42 the pin 45 on the bar is caused to make engagement with the two bottom edges 58 and 59 of the two recesses in the arms 56 and 57 of the brake levers 48 and 50 and the levers are thereby moved about their pivots 38, 40 against the pull of the spring 55 to the brakes "off" position (FIGS. 2 and 7) so that the spool carriers 12 and 15 are released for rotation.

During recording or rerpoduction the parts are in the positions shown in FIG. 2 and the tape is drawn from the take-off spool on the take-off spool carrier 12 by the pull between the capstan spindle 33 and the pressure roller 44 and is wound onto the take-on spool on take-on spool carrier 15, the latter being driven by the rotatable drive disc 14 itself driven from the pulley 4 on the motor spindle 3, through the friction wheel 26 now in its lowered position, the drive between rotatable drive disc 14 and the take-on spool carrier 15 being through the friction slip coupling disc 16 between them which enables the speed of rotation of the take-on spool carrier 15 to accommodate itself to the rate of movement of the tape 41 by the capstan spindle 33.

To effect a rapid wind-on of tape on to the take-on spool on carrier 15 the post is first returned to the position at the junction of the three limbs 66, 67, 68 of the T-shaped slot so that the movable parts including the brake levers 48, 50 return to the previously described rest position of FIG. 1.

Figure 3:
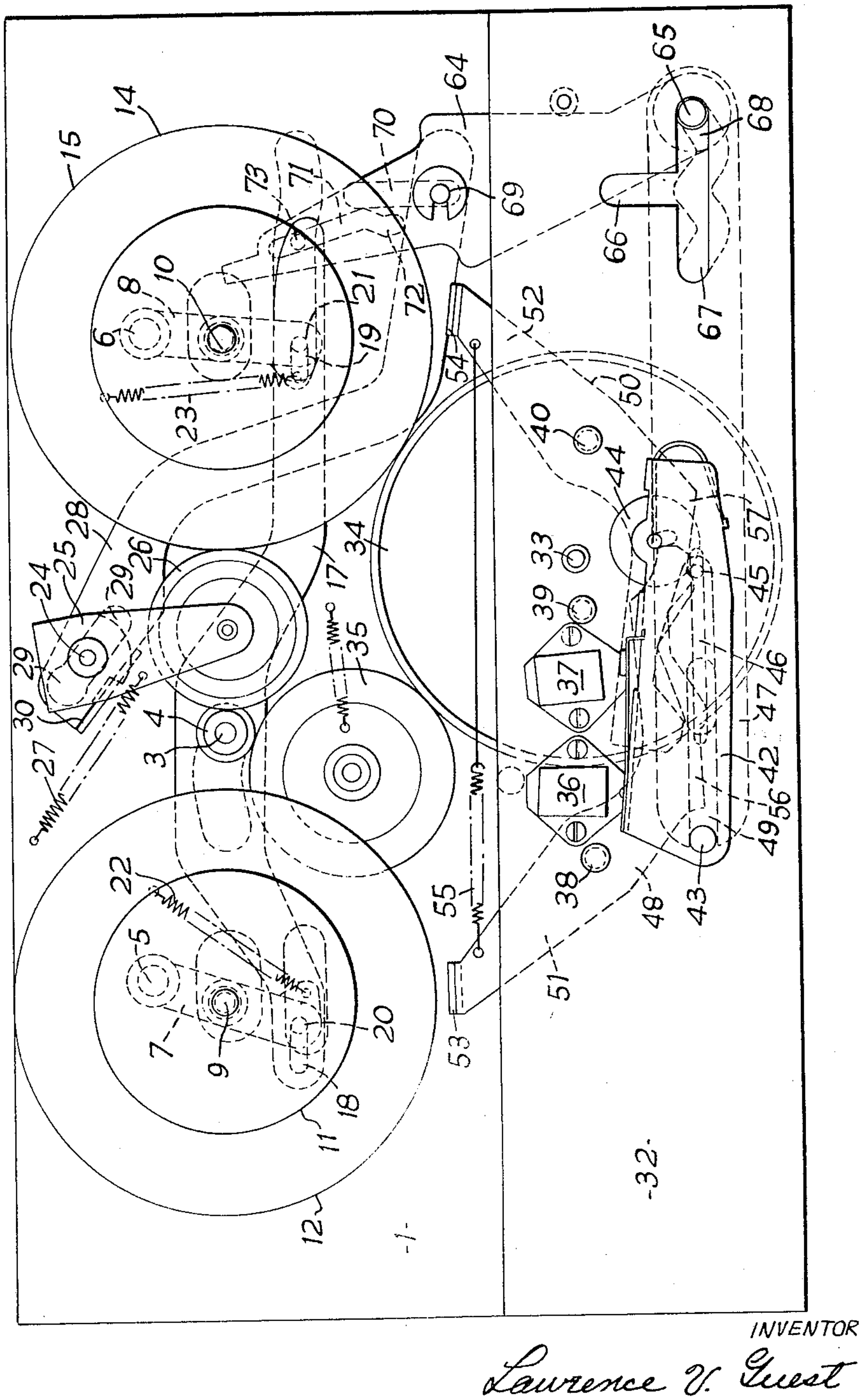

The post 65 is now moved into the limb 68 of the T shaped slot i.e. to the right in the drawings to cause the parts to take the position shown in FIG. 3.

The movement of the post 65 imparts a swinging movement to the lever 64 about the axis of the pin 69 now at the lower end of the slot 70 in the base plate 1. This movement is without effect on link 17 so that friction wheel 26 remains raised. Engagement of the slot 71 in lever 64 with the pin 73 on bar 17 moves the bar in the direction to bring the periphery of the take-on spool carrier 15 into contact with the friction wheel 26 and the friction wheel into contact with the pulley 4 on motor spindle 3. The bar 47 connected with the post 65 moves with the post 65 in the general direction of the bar 47, (to the right in the drawings) the pin 45 sliding in the slot 46 so that the frame 42 remains unaffected and the pressure roller remains away from the capstan spindle 33.

As this movement of the bar 47 proceeds the pin 45 on the bar moves across the recesses in the arms 56 and 57 of the brake levers 48, 50 towards the right as shown in FIG. 8 and makes contact with the inclined edges 61 and 62.

The edge 62 of lesser inclination on lever 50 is engaged by the pin 45 before the edge 61 of greater inclination on lever 48 so that the lever 50 is rocked to release the brake from take-on spool carrier 15 just prior to movement of lever 48 to release take-off spool carrier 12. FIG. 8 shows the brake shoe 54 disengaged from the take-on spool carrier 15 and the brake shoe 53 about to be disengaged from the take-off spool carrier 12.

In this manner the loop of tape between the spools is maintained under tension since over-run by the take-off spool 12 as a result of the sudden starting into rapid rotation of the take-on spool 15 is prevented.

It will be understood that in these conditions the take-on spool carrier 15 is driven directly by the friction wheel 26 and pulley 4 and relative to the rotatable drive disc 14 beneath the take-on spool carrier.

When rapid wind-on is to cease the post 65 is returned to the position at the junction of the three limbs 66, 67, 68 of the T shaped slot and the parts resume the rest position of FIG. 1. As the bar 47 is returned to its rest position the pin 45 disengages from the inclined edges 61 and 62 of the recesses in the brake levers the edge 61 of greater inclination being disengaged first so that the take-off spool carrier 12 is braked by the brake shoe 53 before the take-on spool carrier 15 is engaged by the brake shoe 54 and the edge 62 of lesser inclination ensures a relatively slow progressive braking of the take-on spool carrier 15 in follow-up of a faster braking of the take-off spool carrier 12.

Thus again the loop of tape between the spools is maintained under tension but without risk of breakage of the tape or other derangement.

Figure 4:
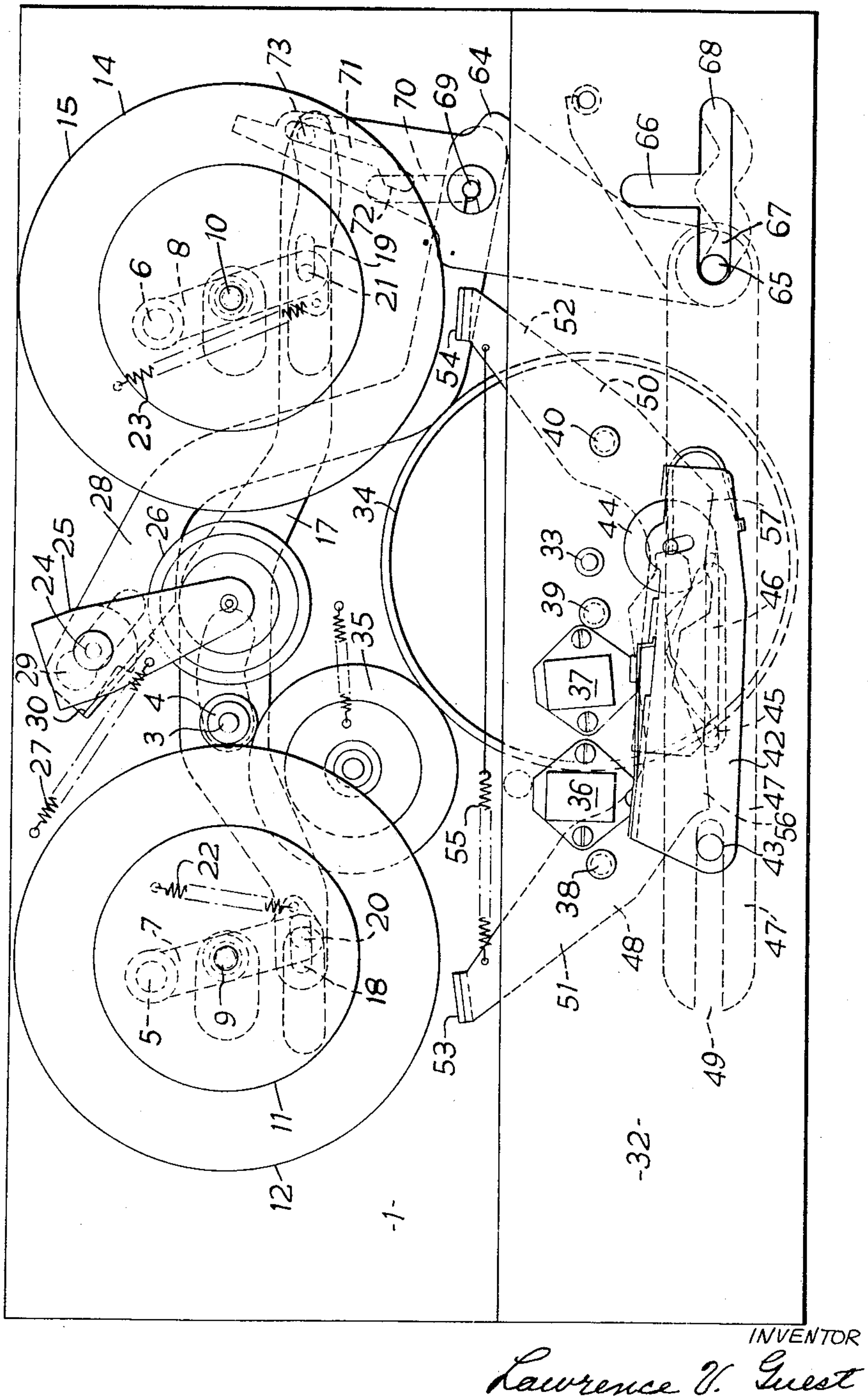
FIG. 4 is a plan view showing the parts in the positions occupied during rapid re-wind.

To effect rapid rewind of the tape 41 on to the take-off spool on take-off spool carrier 12 the post 65 is moved from the rest and braked-spool carrier position of FIG. 1 into the limb 67 of the T shaped slot i.e. to the left hand position as shown in FIG. 4.

Again a transverse swinging movement of the lever 64 is involved again without effect upon the link 28, so that the friction wheel 26 remains raised, and again without effect upon the frame 42 so that the pressure roller 44 remains away from the tape 41 and the capstan spindle 33.

The bar 17 however is moved in the opposite direction to that previously described, i.e. to the right in the drawings, by the engagement of the pin 73 in the slot 71 in the lever 64.

The take-off spool carrier 12 is thus permitted to move under the pull of the spring 22 on the bearing lever 7, into direct engagement with the pulley 4 on the motor spindle 3, the assembly comprising the rotatable drive disc 14 and the take-on spool carrier 15 thereon moving further away from the motor spindle 3 so that there is no driving engagement between that assembly, the friction wheel 26 and the pulley 4 on the motor spindle 3.

In this instance as the bar 47 is moved to the left the upstanding pin 45 thereon makes engagement with the inclined end edges 60 and 63 of the recesses in the arms 56 and 57 of the brake levers 48, 50.

The pin 45 first engages the edge 60 of lesser inclination of the recess in lever 48 so that the brake shoe 53 is disengaged first from the take-off spool carrier 12 (see FIG. 9) the spool of which is now intended to receive tape. Further movement of the bar 47 and pin 45 involves contact between pin 45 and the end edge 63 of greater inclination on lever 50 to release the brake shoe from take-on spool carrier 15 from which tape is now to be unwound.

The tape is now drawn rapidly from what is normally the take-on spool on take-on spool carrier 15 and wound on to what is normally the take-off spool on the take-off spol carrier 12.

Rapid re-wind is caused to cease by return of the post 65 and the parts controlled thereby to the position of rest shown in FIG. 1.

Again as the bar 47 is moved by the post 65 to the rest position the pin disengages first from the edge 63 of greater inclination of the recess of lever 50 to first apply the brake shoe 54 to the trailing spool carrier i.e. the spool carrier 15 and thereafter progressive disengagement of the pin 45 from the edge 60 of the recess of lever 48 takes place to apply the brake shoe 53 progressively to the leading spool carrier i.e. spool carrier 12.

I claim:

1. In a magnetic tape recorder and reproducer having a base plate and two carriers for the tape spools on parallel axes normal to the base plate and each rotatable in both directions, braking means for the spool carriers comprising a pair of two-armed levers with one arm of one lever superimposed on one arm of the other lever, brake pads on the other arms of said levers, separate pivots for said levers fixed with reference to the base plate, elongated and overlapping recesses one in each of the two superimposed arms of said two-armed levers, a hand control, a brake-operating element moved to and fro by said hand control selectively over two different paths, a first pair of abutment surfaces constituted by parts of the boundaries of said overlapping recesses intermediate the ends thereof engaged by said brake-operating element and effecting simultaneous rocking movement of said levers between brake "on" and brake "off" positions and vice versa on movement of said brake-operating element in either direction over one of the two different paths, a second pair of abutment surfaces constituted by offset adjacent end parts of the boundaries of said overlapping recesses, engaged sequentially by said brake-operating element and effecting sequential rocking movement of said levers between brake "on" and brake "off" positions and vice versa on movement of said brake-operating element in either direction in one range of movement of said element over the other of said two different paths, and a third pair of abutment surfaces constituted by offset adjacent end parts of the boundaries at the other ends of said overlapping recesses, engaged sequentially by said brake-operating element and effecting sequential rocking movement of said levers, which is the reverse of the first mentioned sequential rocking movement, between brake "on" and brake "off" positions and vice versa on movement of said brake-operating element in either direction in another range of movement of said element over the other of said two different paths.

2. In a magnetic tape recorder and reproducer having a base plate and two carriers for tape spools on parallel axes normal to the base plate and rotatable in both directions, braking means for the spool carriers comprising a pair of levers, separate pivots for said levers fixed with reference to the base plate, spring means interconnecting said levers to bias them into brake-on positions, abutment surfaces on said levers, a movable bar formed at one end with a slot extending in the direction of the length thereof, a hand control provided on the other end of said bar for effecting movement thereof, a fixed pivot pin extending into and in sliding engagement with the slot in said bar, a brake-operating element in the form of a projection on said bar at a position between the two ends thereof and extending transversely to said abutment surfaces, said bar being movable by said hand control in the direction of its length relatively to said fixed pivot pin to effect movement of said projection in a linear path extending in opposite directions from a neutral position and said bar being pivotal on said pivot pin to effect movement of said projection in a path extending transversely to said linear path in said neutral position, a first pair of said abutment surfaces on said levers engageable by said projection to effect simultaneous rocking movements of said levers against the force of said spring means from the brake-on positions to the brake-off positions on movement of said projection away from the neutral position in the transversely extending path, a second pair of said abutment surfaces on said levers off-set from one another to be engageable sequentially by said projection to effect sequential rocking movements of said levers from the brake-on positions to the brake-off positions on movement of said projection in the linear path in one direction from said neutral position and a third pair of said abutment surfaces on said levers off-set from one another to be engageable sequentially by said projection to effect sequential rocking movements of said levers, in a sequence which is the reverse of the first mentioned sequential rocking movements, from the brake-on positions to the brake-off positions on movement of said projection in the linear path in the other direction from said neutral position.

References Cited in the file of this patent

UNITED STATES PATENTS

| | | |
|---|---|---|
| 2,712,448 | Schroter | July 5, 1955 |
| 2,741,439 | Dale et al. | Apr. 10, 1956 |

FOREIGN PATENTS

| | | |
|---|---|---|
| 208,960 | Australia | June 26, 1957 |